United States Patent [19]

Harris et al.

[11] Patent Number: 5,372,732
[45] Date of Patent: Dec. 13, 1994

[54] DELAYED RELEASE BORATE CROSSLINKING AGENT

[75] Inventors: Phillip C. Harris; Stanley J. Heath, both of Duncan, Okla.

[73] Assignee: Halliburton Company, Duncan, Okla.

[21] Appl. No.: 964,188

[22] Filed: Oct. 21, 1992

[51] Int. Cl.$^5$ ............................................. E21B 43/26
[52] U.S. Cl. ................................... 507/217; 166/308; 536/114; 507/903; 507/922
[58] Field of Search ................... 252/8.551; 536/114; 166/308

[56] References Cited

U.S. PATENT DOCUMENTS

| | | | |
|---|---|---|---|
| 3,079,332 | 2/1963 | Wyant | 252/8.551 |
| 3,096,284 | 7/1963 | Slate | 252/8.551 |
| 3,227,212 | 1/1966 | Black et al. | 166/22 |
| 4,214,912 | 7/1980 | Racciato et al. | 536/114 X |
| 4,619,776 | 10/1986 | Mondshine | 252/8.551 |
| 4,620,596 | 11/1986 | Mondshine | 166/292 |
| 4,621,692 | 11/1986 | Mondshine | 166/281 |
| 4,645,833 | 2/1987 | Bayerlein et al. | 536/114 X |
| 4,745,184 | 5/1988 | Bayerlein et al. | 536/114 X |

*Primary Examiner*—Gary Geist
*Attorney, Agent, or Firm*—Robert A. Kent

[57] ABSTRACT

Disclosed herein is a delayed crosslinking agent. This crosslinking agent contains a borate source and a water-soluble polysaccharide. Suggested borate sources include borax, boric acid, and sodium tetraborate. Guar gum, carboxymethylhydroxypropylguar, and hydroxypropylguar are recommended water-soluble polysaccharides. The borate source is present in an amount of from about 5 to about 30% percent by weight, calculated as $B_2O_3$, of the water-soluble polysaccharide.

These delayed crosslinking agents are transported to the well site and admixed with an aqueous solution containing additional water-soluble polysaccharide. The delayed crosslinking agents re-equilibrate in the aqueous solution of the water-soluble polysaccharide. The resulting compositions are useful as fracturing fluids.

11 Claims, No Drawings

DELAYED RELEASE BORATE CROSSLINKING AGENT

BACKGROUND OF THE INVENTION

1. Field Of The Invention

This invention relates to crosslinked polymer gel compositions that may be used as fracturing fluids for oil and gas wells. More specifically, this invention relates to a method of producing a delayed release borate crosslinking agent, wherein the crosslinking agent is a dried borate-crosslinked water-soluble polysaccharide that reequilibrates when placed in a solution of water-soluble polysaccharide.

2. Background and Description Of The Related Art

Polymer gel plugs ("PGP") are often used as temporary well controls. These gel plugs are fluids, designed to form a stiff gel structure when placed in the wellbore. The PGPs can be used under well temperatures as high as 180° C. Depending upon their specific composition, they may be stable for several hours or for several weeks. When operations are complete, the gel plug may be removed by adding an acid or some other substance to break up its structure. In some well control applications, PGPs may be used when mechanical devices would be impractical, unavailable, or uneconomical.

The gelling agent of the polymer gel plug is typically an aqueous colloid of water soluble polymer. Generally, a high molecular weight water soluble polysaccharide is used. When these polysaccharides hydrate, a viscous gel forms. The viscosity of the resulting gel increases with the concentration of the polymer. The viscosity of the gel may also be increased by adding a crosslinking agent. Two varieties of polymer gel plugs are known in the art; those with crosslinking agents and those without. Gel plug compositions lacking crosslinking agents typically employ higher (2–7% by weight) concentrations of polysaccharide. When a crosslinking agent is used, stiff gel structures can be obtained with lower (0.5–2.0% by weight) concentration of polysaccharide.

At lesser concentrations of polysaccharide and/or crosslinking agent, the resulting gel structure will flow. Although such fluid gel structures are ineffective for plugging subterranean formations, they are useful as fracturing fluids. These fracturing fluids are used to break up the structure and increase the permeability of the hydrocarbon-bearing formation. In addition to being less viscous than a gel plug, the gel component of these fracturing fluids is designed to have a much shorter lifetime.

One method of producing a crosslinked gel entails adding the borate crosslinking agent on the fly to a batch or continuously mixed polysaccharide gelling agent. The borate source usually comprises a rapidly soluble, inexpensive, borate compound such as boric acid, borax or Polybor (Black et al., U.S. Pat. No. 3,227,212). One problem with such crosslinking gels is that they form a stiff gel structure very quickly. This in turn produces high pumping pressures and limits the extent of their use.

While the use of a delayed borate source, such as ulexite or colemanite, will substantially lower the pumping pressure the cost of these crosslinking agents is significantly higher (Mondshine, U.S. Pat. Nos. 4,6201,596 and 4,619,776).

Thus, the need exists for a fracturing fluid that inexpensive yet capable of yielding low pumping pressures.

SUMMARY OF THE INVENTION

Disclosed herein is a dry, granulated, delayed crosslinking agent. The crosslinking agent contains a borate source and a water-soluble polysaccharide. Suitable borate sources include borax, boric acid, and sodium tetraborate as well as any other borate source that does not adversely react with the other constituents. Guar gum, carboxymethylhydroxyethylguar, and hydroxypropylguar are recommended water-soluble polysaccharides. The borate source is present, calculated as $B_2O_3$, in an amount of from about 5 to about 30% percent by weight of the water-soluble polysaccharide.

The dry, granulated crosslinking agents of the instant invention are prepared by dissolving the borate source in an aqueous solution of water-soluble polysaccharide, drying the resulting composition, and then grinding the dried composition. These dry, granulated crosslinking agents are then transported to the well site. At the well site the dry, granulated crosslinking agents are admixed with additional water-soluble polysaccharide. The dry, crosslinking agents re-equilibrate in the aqueous solution of the water-soluble polysaccharide. The resulting compositions are extremely useful as fracturing fluids.

One advantage of the instant compositions is that they are lower in cost than other delayed release crosslinking agents. The simple borate compounds of the instant invention are less costly than the complex borate compounds such as colemanite and ulexite utilized in the prior art.

Another advantage of the instant compositions is that they yield longer release times. This allows the fracturing fluid to be pumped into the well at lower pressures. Thus lowering the cost and increasing the effectiveness of the operation.

Yet another advantage of the instant compositions is the method by which they can be utilized to fracture wells. The dried, granulated borate-crosslinking agents can be prepared and then shipped to the well site. They are then added at the well site to a solution of water-soluble polysaccharide. This lowers the cost of shipping the crosslinking agents in comparison to liquid crosslinking agents and simplifies the method of making the fracturing fluids at the well site.

These and other advantages will be realized when the instant compositions are used to fracture oil and gas wells.

DESCRIPTION OF THE PREFERRED EMBODIMENTS

The gelling agent used in this invention is a high molecular weight water-soluble polysaccharide. The most useful polysaccharides for the practice of this invention have molecular weights in the range of about 200,000 to 3,000,000. Of these polysaccharides, guar and its derivatives are preferred. Specifically, these include guar gum, locust bean gum, karaya gum, carboxymethylguar, hydroxyethylguar, carboxymethylhydroxyethylguar, hydroxypropylguar, carboxymethylhydroxypropylguar, and mixtures thereof. Guar is a branched copolymer composed of a mannose backbone with galactose branches. This polysaccharide contains cis-hydroxyl groups, which can complex with crosslinking agents such as aluminum, titanium, zirconium, antimony, chromium and borate.

The crosslinking agent utilized in the instant invention must be capable of yielding borate ions in solution. Sparingly soluble borates such as alkaline earth metal borates, alkali metal alkaline earth metal borates, and mixtures thereof are examples of suitable borate sources. Exemplary minerals which are representative of these broad classes of compounds are as follows:

| | |
|---|---|
| Probertite: | $NaCaB_5O_9.5H_2O$ |
| Ulexite: | $BaCaB_5O_9.8H_2O$ |
| Nobleite: | $CaB_6O_{10}.4H_2O$ |
| Gowerite: | $CaB_6O_{10}.5H_2O$ |
| Frolovite: | $Ca_2B_4O_8.7H_2O$ |
| Colemanite: | $Ca_2B_6O_{11}.5H_2O$ |
| Meyerhofferite: | $Ca_2B_6O_{11}.7H_2O$ |
| Inyoite: | $Ca_2B_6O_{11}.13H_2O$ |
| Priceite: | $Ca_4B_{10}O_{19}.7H_2O$ |
| Tertschite: | $Ca_4B_{10}O_{19}.20H_2O$ |
| Ginorite: | $Ca_2B_{14}O_{23}.8H_2O$ |
| Pinnoite: | $MgB_2O_4.3H_2O$ |
| Paternoite: | $MgB_8O_{13}.4H_2O$ |
| Kurnakovite: | $Mg_2B_6O_{11}.15H_2O$ |
| Inderite: | $Mg_2B_6O_{11}.15H_2O$ |
| Preobrazhenskite: | $Mg_3B_{10}O_{18}.4\frac{1}{2}H_2O$ |
| Hydroboracite: | $CaMgB_6O_{11}.6H_2O$ |
| Inderborite: | $CaMgB_6O_{11}.11H_2O$ |
| Kaliborite (Heintzite): | $KMg_2B_{11}O_{19}.9H_2O$ |
| Veatchite: | $SrB_6O_{10}.2H_2O$ |

The most preferred borate sources are those that yield the highest concentration of borate ions in solution and are rapidly soluble in a solution of polysaccharide. Exemplary compounds which fulfill these requirements are borax, boric acid, and sodium tetraborate. A particularly useful source is Polybor, a product of U.S. Borax Company, which comprises a proprietary composition comprising boric acid and dimers and trimers of borate ions.

The dry, granulated, delayed crosslinking agents of the instant invention will contain from about 5 to about 30% by weight of the borate ion source, calculated as $B_2O_3$, preferably from about 10–20% by weight, of the water-soluble polysaccharide. Only a small amount of borate source will be needed from those borate sources that yield a high concentration of borate ions in solution whereas a greater amount of borate source will be required of those borate sources that yield a low concentration of borate ions in solution.

A quantity of the delayed release crosslinking agent of the present invention was prepared by the method set forth hereafter. An initial polysaccharide solution was prepared by dissolving 0.48% by weight guar in water. The pH of the solution was adjusted to about 7 by the addition of 0.015% by weight of an acetic acid-acetate buffer solution to facilitate hydration of the guar. After hydration, the guar solution was adjusted to a pH of about 12.0 by the addition of 0.25% by weight of a 25% NaOH solution. A soluble borate solution was prepared by dissolving 12% by weight Polybor in water.

A highly crosslinked guar polymer then was prepared by adding 2.0% by volume of the borate solution to a quantity of the guar solution while stirring the mixture. The specific quantity of borate ion source added to the guar may vary as previously indicated. The mixture then was heated to about 150° F. to accelerate the rate of the crosslinking reaction. It should be understood that heating is not necessary, however, to effect the crosslinking. Upon standing the guar polymer becomes overcrosslinked and precipitates from the solution. Various compounds such as, for example, potassium chloride or various other salts, alcohol, acetone or the like may be added to the mixture to facilitate precipitate formation. In this particular instance a small quantity of potassium chloride, about 2% by weight, was added to the mixture. The precipitated mass then was separated from the aqueous solution, dried in a drying oven for several hours to remove moisture and ground to a particulate or granule size capable of passing through a 10 mesh screen on the U.S. Sieve Series. It is to be understood that the particulate particle size is not critical and that the material may vary from a powder to granules in excess of ¼" in diameter.

To re-equilibrate, the dried, granulated, delayed crosslinking agent is admixed with an aqueous gel of about 0.2 to about 1.0% by weight of a water-soluble polysaccharide in a weight ratio of 20:1 to 1:1 polymer:crosslinking agent. This ratio is preferably about 4:1.

The fracturing fluids of this invention may also contain fluid loss control additives, surfactants, propping agents, clay control chemicals, concentrations of salts which are compatible with the gelling agent, oxygen scavengers, water-soluble alcohols, particularly alcohols having 1 to 3 carbon atoms, and internal breakers.

The internal breakers are generally either enzymes or oxidizing agents. Enzymes suitable for this purpose are those which catalyze the hydrolysis of the glycosidic bends between the monomer units of the polysaccharide. Suitable oxidizing agents for breaking down the gel structure include for example ammonium persulfate, sodium persulfate, potassium persulfate and the like.

A polymer solution is prepared at a fluid location where a subterranean formation is to be treated. The polymer solution may be either batch mixed or mixed on the fly as it is utilized. The typical polymer solution consists of about 0.48% by weight guar in water. Additives such as potassium chloride or other salts, surfactants, clay stabilizers, buffers, bactericides, breakers, proppants and the like may be admixed with the polymer solution. The polymer solution, if batch mixed, is transferred from a storage tank to a field blender unit where the additives are added if not previously added to the solution. A quantity of the dried crosslinked polymer of this invention is admixed with the polymer solution in the blender prior to injection into the wellbore penetrating the subterranean formation to be treated. The polymer solution generally will include about 0.2% by weight of the delayed crosslinking agent of the present invention, however greater quantities may be utilized as previously described. The particular quantity of delayed crosslinker will depend upon the borate ion concentration and the polymer solution concentration. Once the delayed release crosslinking agent is added to the polymer solution, the borate ion in the crosslinker will re-equilibrate with the polymer in solution and eventually form crosslinks with all the polymer present in the solution. The reequilibration process requires a period of time thereby causing a delay in the increase in viscosity of the polymer solution such that the viscosity of the solution does not significantly increase until after the entire mixture is pumped from the blender and injected into the wellbore penetrating the subterranean formation to be treated.

In an alternative embodiment of the present invention, the delayed crosslinker of the present invention may be prepared, such as at a field location, and the precipitated material may be immediately admixed with a polymer solution to be crosslinked without any drying of the delayed crosslinker. The precipitated mass will contain some water and perhaps other additives as previously described, however such materials will not prevent the reequilibration described herein of the borate ion in the polymer solution. The precipitated material may be pumped directly from the container in which it is formed into the blender where it is admixed with the polymer solution to be crosslinked. The solution may then be utilized as previously described.

Although several preferred embodiments have been described in a fair amount of detail, it is understood that such detail has been for purposes of clarification only. Various modifications and changes will be apparent to one having ordinary skill in the art without departing from the spirit and scope of the invention as hereinafter set forth in the claims.

What is claimed:

1. A method of fracturing a well comprising:
   (a) providing a delayed crosslinking agent comprising a first water-soluble polysaccharide and a borate source wherein said borate source is present in an amount of from about 5 to about 30% by weight, calculated as $B_2O_3$, of said first polysaccharide;
   (b) admixing said delayed crosslinking agent with an aqueous gel wherein said gel comprises from about 0.2 to about 1.0% by weight of a second water-soluble polysaccharide solution, wherein said first and second water-soluble polysaccharides are the same or different; and
   (c) placing the composition formed in step (b) into said well.

2. A method according to claim 1 wherein said borate source is a boric acid containing compound.

3. A method according to claim 1 wherein said borate source is borax.

4. A method according to claim 1 wherein said borate source is sodium tetraborate.

5. A method according to claim 1 wherein said first and second water-soluble polysaccharides are independently guar gum, hydroxypropylguar, or carboxymethylhydroxypropylguar.

6. A dry, granulated, delayed crosslinking agent comprising a borate source and a water-soluble polysaccharide comprising at least one member selected from the group of guar gum, hydroxypropylguar and carboxymethylhydroxypropylguar wherein said borate source is present in an amount of from about 5 to about 30% by weight, calculated as $B_2O_3$, of said polysaccharide.

7. A delayed crosslinking agent according to claim 6 wherein said borate source is a boric acid containing compound.

8. A delayed crosslinking agent according to claim 6 wherein said borate source is borax.

9. A delayed crosslinking agent according to claim 6 wherein said borate source is sodium tetraborate.

10. A method of making a dry, granulated, delayed crosslinking agent comprising:
    (a) dissolving from about 0.2 to about 1.0% by weight of a water-soluble polysaccharide comprising at least one member selected from the group of guar gum, hydroxypropylguar and carboxymethylhydroxypropylguar in an aqueous solution;
    (b) adding a borate source to the aqueous gel formed in step (a) wherein said borate source is added in an amount of from about 5% to about 30% by weight, calculated as $B_2O_3$, of said polysaccharide;
    (c) drying the borate-crosslinked polysaccharide formed in step (b) and
    (d) granulating the produce of step (c).

11. A method according to claim 10 wherein said borate source is borax, boric acid or sodium tetraborate.

* * * * *